(12) United States Patent
Bell et al.

(10) Patent No.: US 6,935,451 B2
(45) Date of Patent: Aug. 30, 2005

(54) AXLE ASSEMBLY WITH PARALLEL DRIVE SYSTEM FOR ELECTRIC HYBRID VEHICLES

(75) Inventors: Dale K. Bell, Ortonville, MI (US); Dennis A. Kramer, Troy, MI (US); Clive Harrup, Bromham Beds (GB); Mehmet S. Ciray, Greenwood, IN (US); Silvio M. Yamada, Gahanna, OH (US); Dean M. House, Pataskala, OH (US); David K. Platner, Shelby, MI (US); Dale J. Eschenburg, Clinton Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 40 days.

(21) Appl. No.: 10/282,738

(22) Filed: Oct. 29, 2002

(65) Prior Publication Data

US 2004/0079568 A1 Apr. 29, 2004

(51) Int. Cl.$^7$ .............................................. B60K 1/00
(52) U.S. Cl. .................... 180/65.5; 180/65.2; 180/65.3; 180/65.4
(58) Field of Search ............................... 180/65.2, 65.3, 180/65.4, 65.5; 301/137; 477/2, 3, 8; 475/220, 331, 332

(56) References Cited

U.S. PATENT DOCUMENTS

| | | | |
|---|---|---|---|
| 638,645 | A | 12/1899 | Newman et al. |
| 644,225 | A | 2/1900 | Elsner |
| 1,251,749 | A | 1/1918 | Cilley |
| 1,481,405 | A | 1/1924 | Anglada |
| 1,540,526 | A | 6/1925 | Anglada |
| 1,735,404 | A | 11/1929 | Masury |
| 1,906,930 | A | 5/1933 | Ledwinka |

(Continued)

FOREIGN PATENT DOCUMENTS

| | | |
|---|---|---|
| CH | 679 027 A5 | 12/1991 |
| DE | 41 12 624 C1 | 10/1992 |
| GB | 502313 | 3/1939 |
| GB | 1 303 615 | 4/1971 |

*Primary Examiner*—Christopher P. Ellis
*Assistant Examiner*—Kelly E Campbell
(74) *Attorney, Agent, or Firm*—Carlson, Gaskey & Olds

(57) ABSTRACT

The inventive parallel drive system is particularly well suited to be supported at the axle of the vehicle. A coupling arrangement includes a clutching mechanism and a gear reduction device that selectively couple an electric motor to the drive wheels for providing torque to the wheels alone or in combination with input from an internal combustion engine. The drive torque can also be provided exclusively from the internal combustion engine. The inventive arrangement also allows for the electric motor to be used as a generator during coasting or braking, for example.

10 Claims, 3 Drawing Sheets

U.S. PATENT DOCUMENTS

| | | | |
|---|---|---|---|
| 3,186,506 A | | 6/1965 | Leach et al. |
| 3,812,928 A | | 5/1974 | Rockwell et al. |
| 3,923,115 A | * | 12/1975 | Helling ...................... 180/65.2 |
| 4,146,104 A | | 3/1979 | Leembruggen |
| 4,330,045 A | | 5/1982 | Myers |
| 4,469,369 A | | 9/1984 | Belik et al. |
| 4,534,442 A | | 8/1985 | Botar |
| 4,930,590 A | | 6/1990 | Love et al. |
| 5,343,970 A | * | 9/1994 | Severinsky ................ 180/65.2 |
| 5,346,031 A | * | 9/1994 | Gardner ...................... 180/179 |
| 5,562,565 A | * | 10/1996 | Moroto et al. ................. 477/3 |
| 5,685,798 A | * | 11/1997 | Lutz et al. ................. 475/331 |
| 5,713,425 A | * | 2/1998 | Buschhaus et al. ........ 180/65.2 |
| 5,789,896 A | | 8/1998 | Fischer et al. |
| 5,823,280 A | * | 10/1998 | Lateur et al. ............... 180/65.2 |
| 5,947,855 A | * | 9/1999 | Weiss ............................. 475/5 |
| 6,044,922 A | * | 4/2000 | Field ......................... 180/65.2 |
| 6,081,042 A | | 6/2000 | Tabata et al. |
| 6,164,400 A | * | 12/2000 | Jankovic et al. ........... 180/65.2 |
| 6,205,379 B1 | | 3/2001 | Morisawa et al. |
| 6,288,508 B1 | | 9/2001 | Taketomi et al. |
| 6,387,007 B1 | * | 5/2002 | Fini, Jr. ...................... 475/268 |
| 6,411,879 B2 | * | 6/2002 | Kupper et al. ................ 701/51 |
| 6,416,437 B2 | * | 7/2002 | Jung ............................. 475/8 |
| 6,484,834 B2 | * | 11/2002 | Bowen et al. ............. 180/65.6 |
| 2003/0181281 A1 | * | 9/2003 | Duggan et al. ............. 475/220 |
| 2003/0183431 A1 | * | 10/2003 | Cikanek et al. ............ 180/65.6 |

* cited by examiner

AXLE ASSEMBLY WITH PARALLEL DRIVE SYSTEM FOR ELECTRIC HYBRID VEHICLES

BACKGROUND OF THE INVENTION

This invention generally relates to drive systems for vehicles. More particularly, this invention relates to a parallel drive system having components mounted at the axle for selectively powering a drive axle of the vehicle.

Vehicles typically are powered by an internal combustion engine or one or more electric motors. Some so-called hybrid vehicles include a combination of an internal combustion engine and electric motor power. Such hybrid vehicles sometimes include parallel drive systems that provide propulsion modes from the electric motor, internal combustion engine or both.

Typically the mechanical coupling that allows selection between electrical or internal combustion power is mounted directly to the internal combustion engine, vehicle transmission or a so-called summation gearbox that combines the electric drive with the mechanical drive. Such arrangements allow for a controller or the vehicle operator to select between the electrical power and the internal combustion power for driving the vehicle.

A major drawback associated with such systems is that special modifications are required for the engine flywheel or the transmission to accommodate the additional coupling required. In embodiments including a summation gearbox, the vehicle chassis also typically must be modified to accommodate the additional components. The economical drawbacks of such arrangements renders them less than ideal. Further, such modifications typically are difficult to implement.

Those skilled in the art are constantly striving to make improvements and to render parallel drive system more economical and usable.

This invention provides a unique arrangement that allows a parallel drive system to be used without requiring modification of the engine flywheel, transmission or vehicle chassis.

SUMMARY OF THE INVENTION

In general terms, this invention is a parallel drive system arrangement suitable for mounting at the axle that selectively controls torque distribution from an internal combustion engine, an electric motor, or a combination of them to the drive wheels.

One example system designed according to this invention includes an axle housing. A coupling arrangement is supported at least in part by the axle housing. An electric motor selectively provides torque through the coupling arrangement to the wheels associated with the axle housing. An input from a vehicle internal combustion engine also selectively provides torque to the wheels, depending on the condition of the coupling arrangement.

An electronic controller operates the coupling arrangement so that torque is provided to the wheels selectively from a drive shaft input associated with the internal combustion engine or the electric motor. When the electric motor provides torque to the wheels, gear reduction assemblies preferably are engaged by the coupling arrangement to provide the desired amount of torque and gear reduction at the wheels. Such gear reduction accommodates for the typical differences between the speeds of electric motors and the desired torque and wheel speed.

In one example, the coupling arrangement selectively couples the electric motor in a generator mode to the wheels so that torque is transferred from the wheels to the motor during coasting or braking, for example. In such an arrangement, regenerative power is provided to charge a power source used to power the electric motor.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
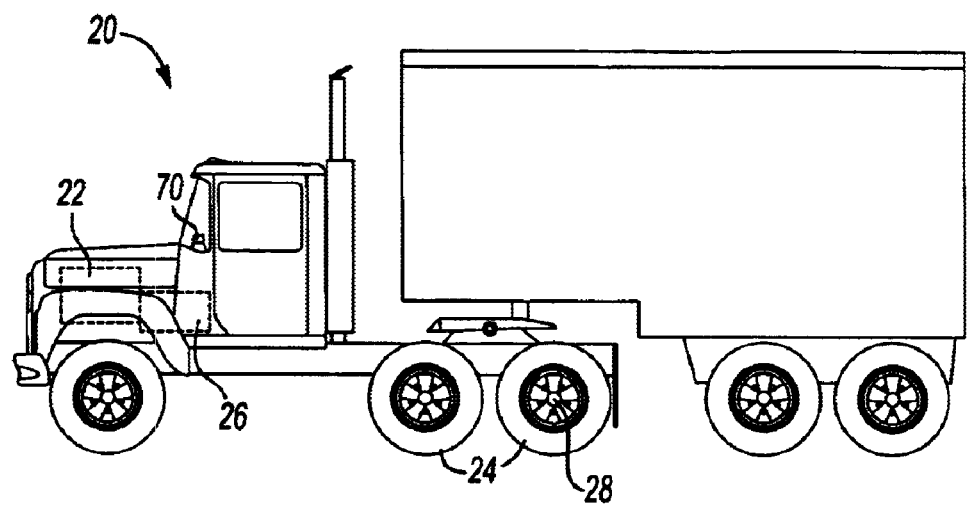
FIG. 1 schematically illustrates an example vehicle incorporating a drive system designed according to this invention.
Figure 2:
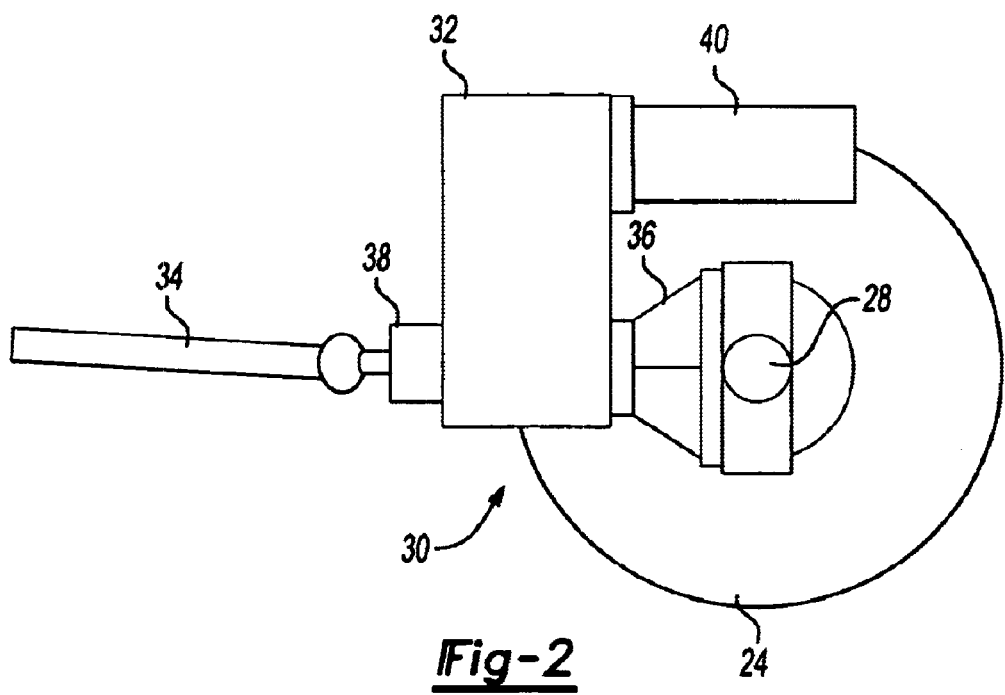
FIG. 2 schematically illustrates a drive system designed according to this invention.

FIG. 1 schematically illustrates a vehicle 20 that is one example type of vehicle with which the inventive drive system may be used. An internal combustion engine 22 provides a driving torque to wheels 24 through a conventional transmission arrangement 26. The wheels 24 are supported by axles 28 in a conventional manner.

Referring to FIGS. 2–5, the inventive drive arrangement includes an axle assembly 30 including a coupling arrangement or gear box 32 for selectively controlling torque distribution to or from the axles 28. When the internal combustion engine 22 provides the drive torque to the axles 28 (the wheels 24), a drive shaft 34 provides the necessary torque input to appropriate components within an axle housing 36 through a coupling 38. The axle housing 36 contains, for example, a conventional differential 39 for providing the desired torque distribution to the wheels 24. The drive shaft 34 provides driving torque to the wheels 24 depending on the operative condition of the coupling 38, which selectively couples the torque from the drive shaft 34 to the axle assembly as needed. In one example, the coupling 38 includes a clutch mechanism that selectively interrupts torque distribution from the drive shaft 34 to the components in the housing 36.

The axle assembly 30 also includes at least one electric motor 40 for providing drive torque to the wheels 24. An electronic controller 42 preferably controls operation of the electric motor 40. A variety of commercially available electric motors and microprocessors may be used within a system designed according to this invention. Those skilled in the art who have the benefit of this description will be able to select from among commercially available components and to develop the necessary software code to achieve the results provided by this invention.

One advantage of this invention is that all of the operative components for distributing torque and the electric motor can all be supported at the locations of the axle. By placing the coupling arrangement at the axle, modifications to the engine flywheel, transmission or vehicle chassis are rendered unnecessary making the inventive arrangement more readily incorporated into a variety of vehicles.

Figure 3:
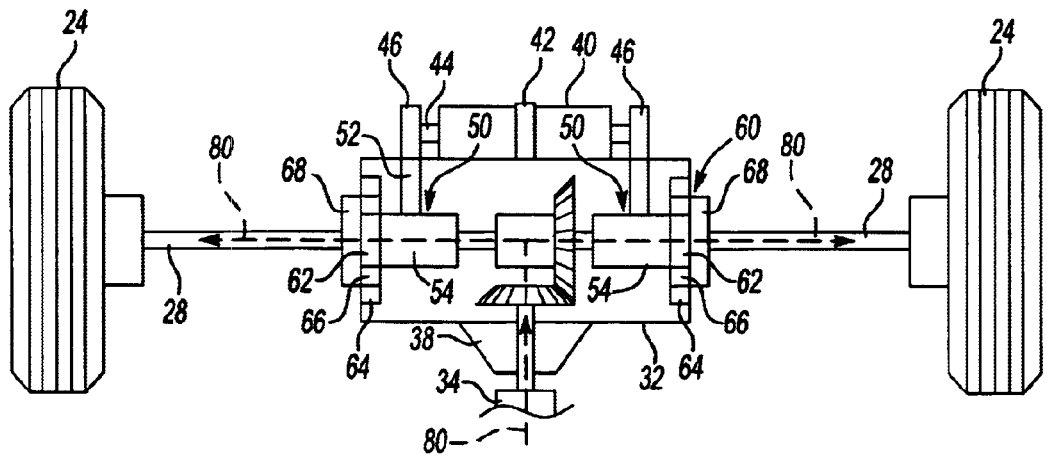
FIG. 3 schematically illustrates selected components of an example drive system designed according to this invention under a first set of operation conditions.

Referring to FIG. 3, the illustrated electric motor 40 includes output shafts 44 and associated output members 46. Rotation of the motor components provides rotation of the output members 46, which can provide torque to the wheels 24 as needed and will be described below.

A clutching mechanism 50 includes an input member 52 (i.e., an idler gear) and a clutch 54 for selectively coupling the output member 46 of the electric motor 40 with the axle 28. The clutch 54 may take a variety of forms, including hydraulic, electromagnetic or a combination of known technologies.

For providing the necessary gear reduction between the motor 40 and the axle 28, the inventive arrangement includes a gear reduction device 60 associated with the coupling arrangement or gear box 32. The example embodiment includes a planetary gear assembly having a sun input gear 62, a ring gear 64, which is fixed relative to the housing of the coupling arrangement or gear box 32 in the illustrated example. A plurality of pinion or planet gears 66 cooperate with the sun gear and ring gear 64 in a known manner such that an output member 68 provides the desired rotation and torque to the axle 28. The clutching mechanism 50 selectively couples the electric motor output to the axle and selectively controls the operation of the gear reduction device 60 so that the desired torque supply is achieved.

The electric motor 40, the coupling 38 and the clutching mechanism 50 all may be controlled by a single controller 42. In another example, individual controllers are dedicated to controlling the operation of each of these devices with the controllers communicating with each other to provide the desired system operation.

FIG. 3 illustrates a torque distribution from the internal combustion engine 22 through the drive shaft 34 to the axles 28. In this condition, the clutching mechanism 50 ensures that the motor 40 is not coupled to the axles 28 and the gear reduction devices 60 do not interfere with the torque delivered from the drive shaft 34 to the axle 28. This is a first mode of operation of the illustrated example arrangement. The torque distribution path is shown at 80 in FIG. 3.

Figure 4:
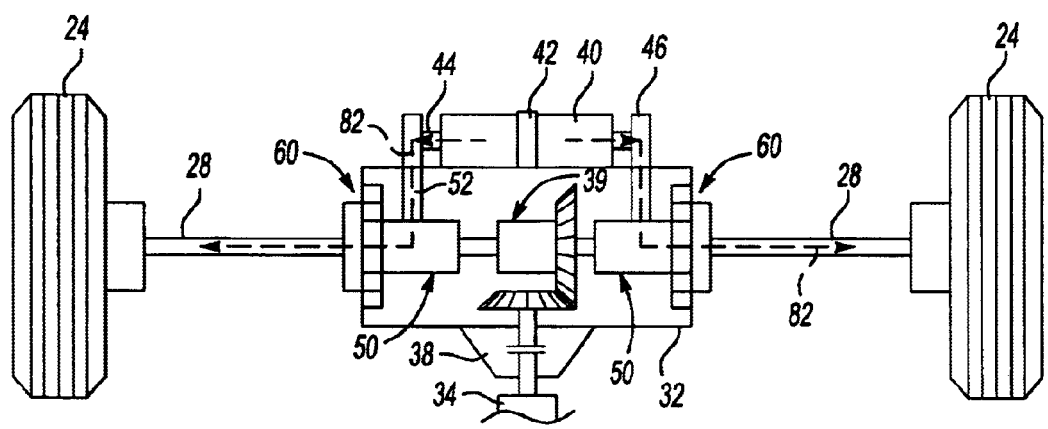
FIG. 4 illustrates the embodiment of FIG. 3 under a second set of operating conditions.

Under certain operating conditions, it may be desirable to provide torque to the axles 28 and wheels 24 exclusively from the electric motor 40. This operating condition is shown in FIG. 4 where the mechanical coupling 38 effectively isolates the drive shaft 34 from the differential 39 and the axle 28. Under these conditions, the clutching mechanism 50 selectively couples the output member 46 from the motor 40 to the input member 52 of the clutching mechanism and the clutches 54 cause appropriate engagement with the gear reduction devices 60 to deliver the desired amount of torque to the axles 28. The torque distribution path in this condition is shown at 82.

Figure 5:
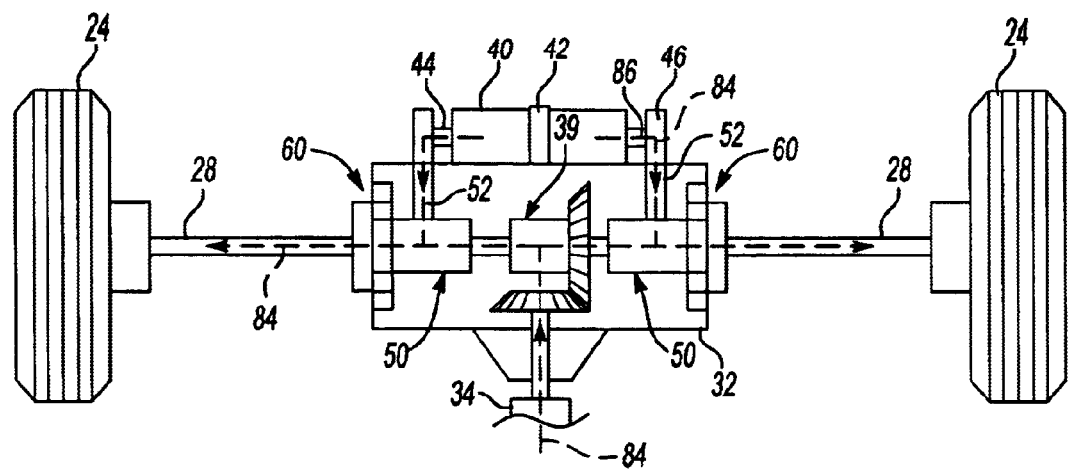
FIG. 5 illustrates the embodiment of FIG. 3 under a third set of operating conditions.

FIG. 5 schematically illustrates another operating condition where torque is supplied to the wheels 24 from a combination of the power from the internal combustion engine 22 and the electric motor 40. Such a torque distribution is schematically illustrated at 84.

Accordingly, the inventive arrangement calls for selectively providing driving torque to the wheels 24 from the internal combustion engine 22, the electric motor 40 or both. The controller 42 preferably is programmed to automatically distribute torque according to selected vehicle performance criteria. Such information may be obtained from a known engine controller already on the vehicle, for example. Those skilled in the art who have the benefit of this description will be able to suitably program a controller to meet the needs of their particular situation.

In another example, the vehicle operator is provided with an interface 70 such as control switches near the steering wheel in the driver compartment for selectively controlling the operation of the axle-mounted drive assembly and, therefore, the torque distribution.

Figure 6:
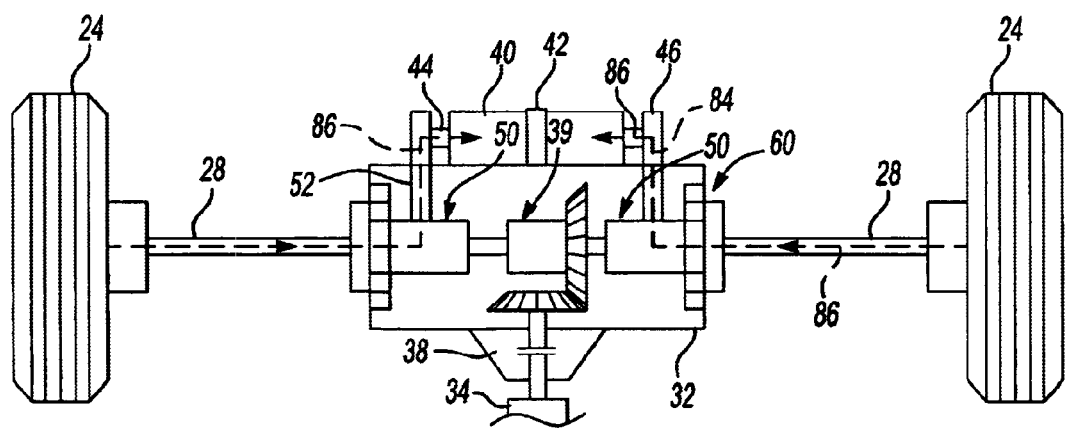
FIG. 6 illustrates the embodiment of FIG. 3 under a fourth set of operating conditions.

FIG. 6 illustrates another feature of the inventive arrangement. A torque distribution path schematically illustrated at 86 shows how torque from the wheels 24 may be transferred back to the motor 40 operating in a generator mode. During braking or coasting, for example, excess torque from the wheels 24 may be transmitted back through the clutching mechanisms 50 to provide rotation of the appropriate motor components to generate power for recharging a power supply (not illustrated) for the motor 40, for example. An additional advantage to such an arrangement is that such regenerative braking can provide additional braking force as may be needed or beneficial.

The drawings schematically illustrate one example assembly designed according to this invention. Other configurations are possible and within the scope of this invention. For example, the gear reduction devices 60 (i.e., planetary gear assemblies) may be mounted at the wheel hubs instead of near the center of the axle assembly. Depending on the particular vehicle and the manner in which the axle is supported relative to the vehicle chassis, the choice of where to mount the various components of the inventive arrangement can be varied to meet the needs of a particular situation. For example, to reduce the unsprung mass of the wheel end the gear reduction devices 60 and the electric motor 40 preferably would be supported near the center of the vehicle as schematically illustrated in FIGS. 3–6.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A vehicle drive assembly, comprising:
    an internal combustion engine;
    a transmission supported within a transmission housing and operably associated with the internal combustion engine;
    a first input member associated with the transmission to provide torque supplied by the internal combustion engine;
    an axle housing that is spaced from and independent of the transmission housing;
    at least one axle shaft supported for rotation relative to the axle housing;
    a first coupling device supported at least partially by the axle housing, the first coupling device selectively coupling the first input member with the axle shaft to deliver torque to the axle shaft;
    an electric motor at least partially supported by the axle housing;
    a second input member associated with the electric motor to provide torque supplied by the electric motor; and
    a second coupling device supported at least partially by the axle housing, the second coupling device selectively coupling the second input member with the axle shaft to deliver torque to the axle shaft.

2. The assembly of claim 1, including a gear reduction device associated with the second coupling device to provide a desired amount of gear reduction between the second input member and the axle shaft.

3. The assembly of claim 2, wherein the second coupling device selectively engages the gear reduction device.

4. The assembly of claim 2, wherein the gear reduction device comprises a planetary gear arrangement.

5. The assembly of claim 4, wherein the planetary gear arrangement is supported near a wheel hub portion of the axle housing.

6. The assembly of claim 1, including a controller that controls operation of the first and second coupling devices to deliver torque to the axle shaft in at least a first mode where only the first input member supplies torque and a second mode where only the second input member supplies torque.

7. The assembly of claim 6, wherein the controller controls operation of the coupling devices to deliver torque to the motor from the axle shaft and the controller controls the motor in the third mode such that the motor functions as a generator in the third mode.

8. The assembly of claim 1, including two axle shafts, a differential supported within the axle housing and coupling the first input member to the axle shafts, and including two of the second coupling devices, each of the second coupling devices associated with a respective one of the axle shafts.

9. The assembly of claim 8, wherein each of the second coupling devices comprises a clutch.

10. The assembly of claim 9, wherein the second coupling devices are supported within a coupling arrangement housing that is supported by the axle housing.

* * * * *